United States Patent [19]

van Merode

[11] Patent Number: 4,480,263

[45] Date of Patent: Oct. 30, 1984

[54] THREE-DIMENSIONAL TELEVISION SYSTEM AND TRANSMITTER SUITABLE THEREFOR

[75] Inventor: Peter C. A. van Merode, Eindhoven, Netherlands

[73] Assignee: U.S. Philips Corporation, New York, N.Y.

[21] Appl. No.: 416,741

[22] Filed: Sep. 10, 1982

[30] Foreign Application Priority Data

Oct. 1, 1981 [NL] Netherlands ........................ 8104475

[51] Int. Cl.³ .............................................. H04N 9/60

[52] U.S. Cl. ........................................................ 358/3

[58] Field of Search ...................................... 358/3, 88

[56] References Cited

U.S. PATENT DOCUMENTS 3,674,921 7/1972 Goldsmith ............................ 358/3

4,236,172 11/1980 Krasnoperov .......................... 358/3

*Primary Examiner*—Michael A. Masinick

*Attorney, Agent, or Firm*—Thomas A. Briody; William J. Streeter; Edward W. Goodman

[57] ABSTRACT

A three-dimensional television system comprising an adapted transmitter (1'), which in further respects does not differ from a color television system in accordance with the PAL, NTSC or SECAM-standard. The three-dimensional display in the standard receiver (2) is based on the use of two colors, an observer observing a color picture display screen (10) through differently colored glasses (19, 20). In the transmitter (1'), a first picture pick-up device (12) is coupled to an input of a matrix-coding circuit (4, 5) via a low-pass filter (14). The filter (14) has a bandwidth which is not more than the bandwidth of the color difference signal channels in the decoding-matrix circuit (7, 8) of the receiver (2). In order to improve the picture quality, a second picture pick-up device (13) may be coupled via a low-pass filter (17) having a wider bandwidth to a different input of the matrix-coding circuit (4, 5).

8 Claims, 4 Drawing Figures

THREE-DIMENSIONAL TELEVISION SYSTEM AND TRANSMITTER SUITABLE THEREFOR

BACKGROUND OF THE INVENTION

The invention relates to a three-dimensional television system comprising a transmitter incorporating a picture pick-up arrangement, a receiver incorporating a picture display device and a signal transmission system arranged between the transmitter and the receiver, the picture pick-up arrangement comprising first and second pick-up devices for recording a scene from different positions, the picture display device having a color picture screen for displaying in two different colors information intended for a left and a right eye, respectively, of an observer, the items of information being contained in first and second subpictures, respectively, which are shifted in the direction of line scan, which, when the overall picture is observed with two eyes through spectacles having glasses of different colors results in a three-dimensional picture.

Three-dimensional television systems are described in an article in the periodical "Journal of the SMPTE", July 1971, pages 539 to 545, inclusive. The article describes several possible constructions, inter alia the solution based on the use of two colors, for which the colors red and green are mentioned.

SUMMARY OF THE INVENTION

The invention has for its object to provide, on the two-color basis, a three-dimensional picture display by means of commercially available pick-up and display devices intended for use in standardized television broadcasting systems. These devices may further be used in closed television systems which satisfy the standard. According to the invention, a three-dimensional television system is therefore characterized in that the said signal transmission system is suitable for signal transmission coded in accordance with the PAL, NTSC or SECAM standards for which purpose the transmitter comprises a matrix-coding circuit and the receiver a decoding-matrix circuit, both incorporating signal channels for processing color difference signals and a luminance signal, an output of the first picture pick-up device in the picture pick-up arrangement being coupled to at least one input of the matrix-coding circuit via a low-pass filter, an output of the second picture pick-up device being coupled to at least one further input of the matrix-coding circuit, the low-pass filter having a bandwidth which is not more than the bandwidth of the color difference signal channels in the decoding-matrix circuit of the receiver.

The invention is based on the recognition that it is possible, while using the standard receiver, to obtain acceptable three-dimensional picture quality when the three-dimensional information is transmitted over two signal channels having different bandwidths. The frequency limitation in one signal channel must then be effected to such an extent that the highest signal frequency, that is to say the bandwidth, does not exceed the signal frequency in the color difference signals in the receiver, so that it is guaranteed that no disturbing cross-talk occurs from this frequency-limited channel to the other signal channel.

The picture quality can be improved in a system in accordance with the invention which is characterized in that in addition to said first low-pass filter, the transmitter comprises a second low-pass filter arranged between the output of the second picture pick-up device and said at least one further input of the matrix-coding circuit, the second low-pass filter having a wider bandwidth than the first low-pass filter, it holding that the sum of the cut-off frequencies of the first and second low-pass filters is less than or substantially equal to the frequency of the chrominance subcarrier specified in the standard.

This enables cross-talk from the luminance signal channel which ultimately arrives in the color difference channels of the receiver to be limited to such an extent that no disturbing cross-color occurs on display.

A system in accordance with the invention in which different signal delay times in the signal channels are taken account of, is characterized in that between the output of the second picture pick-up device and said at least one further input of the matrix-coding circuit, there is provided a signal delay device having a time delay which compensates for at least a portion of the signal time delay occuring in the said low-pass filter which is coupled to the first picture pick-up device.

A further improvement in the picture quality can be obtained in a system in accordance with the invention which is characterized in that between the output of the first picture pick-up device and the at least one input of the matrix-coding circuit coupled thereto, there is provided a signal processing circuit for obtaining, with respect to the signal occurring at the at least one further input of the matrix-coding circuit, a relative amplification of the signal at the first-mentioned at least one input thereof.

By relatively increasing the signal value of the frequency-limited signal, an improved three-dimensional impression is obtained in practice.

A choice, which appeared to be very satisfactory in practice when applying the three-dimensional signal components to the several signal inputs of the matrix-coding circuit, is used in a system in accordance with the invention which is characterized in that the output of the second picture pick-up device is coupled to the red color signal input of the matrix-coding circuit and the output of the first picture pick-up device is coupled to the green color signal input of the matrix-coding circuit or to the green and blue color signal inputs of the matrix-coding circuit, respectively.

When the second low-pass filter is used, the choice of the bandwidths depends on which standard is chosen.

DESCRIPTION OF THE DRAWING

An embodiment of the invention will now be described by way of example with reference to the accompanying drawing, wherein.

DESCRIPTION OF THE PREFERRED EMBODIMENT

Figure 1A:
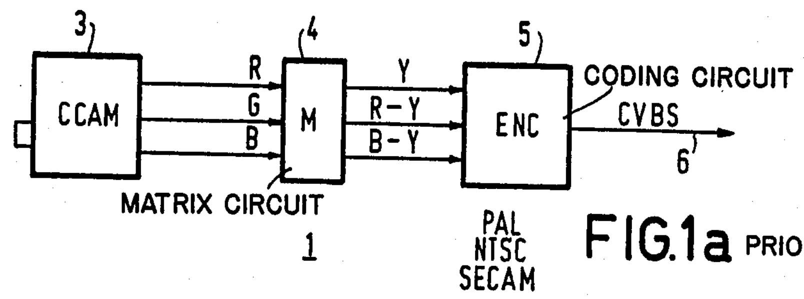
FIG. 1*a* is a block-schematic circuit diagram of a prior art transmitter.
Figure 1B:
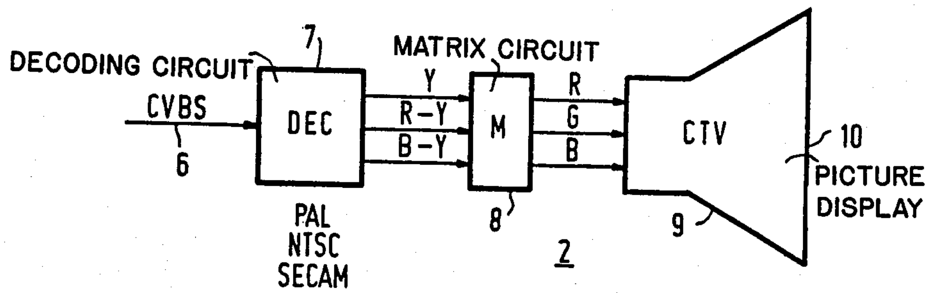
FIG. 1*b* is a block-schematic circuit diagram of a prior art receiver, FIGS. 1*a* and 1*b* forming part of a color television system specified in a standard.

FIG. 1*a* is a block-schematic circuit diagram of a prior art color television transmitter 1 and FIG. 1*b* is a block-schematic circuit diagram of a prior art color television receiver 2. The transmitter 1 incorporates a color television camera (CCAM) 3 which supplies three color signals R, G and B from its output. The color signals R, G and B correspond to the respective red, green and blue light components contained in the light coming from a scene, not shown. The camera 3 applies the color signals R, G and B to color signal inputs of a matrix circuit (M) 4, which forms signals Y, R-Y and B-Y therefrom. The signal Y is a luminance signal for which it holds, as laid down in television standards, that: $Y=0.3R+0.59G+0.11B$. The signals R-Y and B-Y are standard color difference signals. The matrix circuit 4 applies the signals Y, R-Y and B-Y to inputs of a coding circuit (ENC) 5 which applies from an output, a composite video signal CVBS to a transmission channel 6. The signal CVBS thus formed by the matrix-coding circuit (4, 6) comprises, in the manner laid down in the standards, the color (C)-video (V) information and the line and field blanking (B) and synchronizing (S) information. At the coding circuit 5 it is indicated that it may operate in accordance with the PAL, NTSC or SECAM standard.

The transmission channel 6 may be part of a television broadcasting system or a closed television system in which the signal processing and storage or transmission is effected in accordance with the relevant standard. The specific construction of the transmission channel 6 is of no importance, it only being relevant that it leads to the receiver 2 shown in FIG. 1*b*. In the receiver 2, the transmission channel 6 is connected to an input of a decoding circuit (DEC) 7 which is arranged in accordance with the PAL, NTSC or SECAM-standard, depending on the type of coding circuit 5 chosen. The decoding circuit 7 applies from three outputs the decoded signals Y, R-Y and B-Y to three inputs of a matrix circuit (M) 8, which applies the reconverted signals R, G and B to a color picture display device (CTV) 9. The signals R, G and B formed by the decoding-matrix circuit (7, 8) are applied in the device 9 to, for example, three cathodes of an electron gun. In the device 9 three electron beams are deflected line and field sequentially, as a result of which a colored scene image is observable on the display screen 10 of the device 9.

The color television system shown in FIGS. 1*a* and 1*b* is assembled in accordance with one of the standards and comprises between the transmitter 1 and the receiver 2 a signal transmission system (5, 6, 7) incorporating a luminance signal channel (Y) and two color difference signal channels (R-Y, B-Y), these two channels being coupled to a chrominance signal channel in which the color difference information is modulated on a chrominance subcarrier (or on two subcarriers for SECAM).

In accordance with the present invention, the color television system described in the FIGS. 1*a* and 1*b* may be utilized for a three-dimensional picture display. For this purpose, the arrangement shown in FIG. 2*a* comprises an adapted transmitter 1', the receiver 2 of FIG. 1*b* being arranged in FIG. 2*b*. As the picture display device 9 of FIG. 2*b* displays a three-dimensional picture, this is denoted by 3DTV at the device 9. The components corresponding to those shown in FIGS. 1*a* and 1*b* are given the same reference numerals.

Figure 2A:
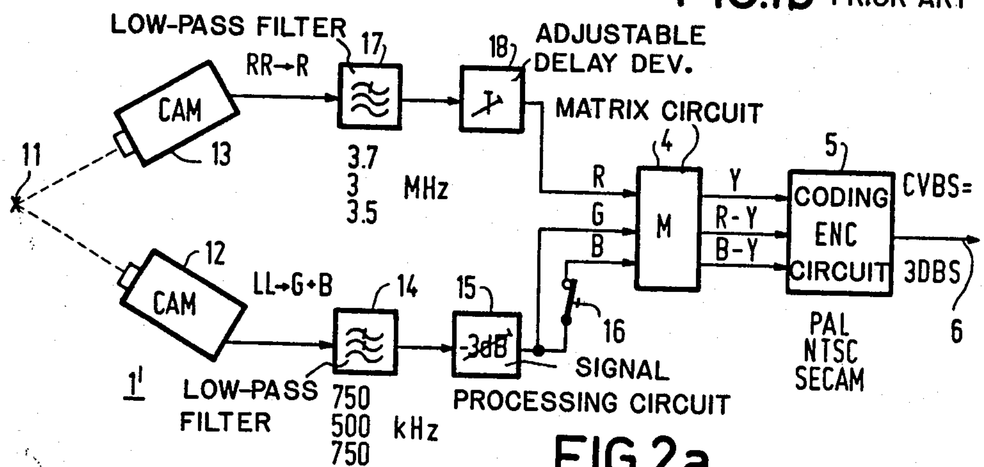
FIG. 2*a* is a block-schematic circuit diagram of a transmitter in accordance with the invention.

In FIG. 2*a*, a scene to be televised is denoted by 11 at the transmitter 1'. The scene 11 is recorded by a first and a second picture pick-up device (CAM) 12 and 13, respectively. The picture pick-up devices 12 and 13 televize the scene 11 from two positions at each instant and represent the eyes of an imaginary observer. The picture pick-up devices 12 and 13 are in the form of e.g. black-white television cameras and together form a picture pick-up arrangement (12, 13) for recording the scene 11 in a three-dimensional way.

The output of the pick-up device 12, corresponding to the left eye LL (FIG. 2*b*) of an observer, is connected to an input of a low-pass filter 14. An output of the filter 14 is connected to an input of a signal processing circuit 15 an output of which being connected to a color signal input (G) of the matrix circuit 4. In addition, the output of the circuit 15 is connected to a further color signal input (B) of the matrix circuit 4 via an on/off-switch 16. In the closed position of the switch 16, shown in FIG. 2*a*, the output of the circuit 15 is connected to the two color signal inputs (G+B). At the pick-up device 12, it is indicated that the information corresponding to the left eye LL is processed in the color television system as the green and blue color signals (LL→G+B). Thus, the transmitter 1' incorporates a signal channel (12,14,15) for recording and processing the three-dimensional information component intended for the left eye LL.

The output of the pick-up device 13, corresponding to the right eye RR (FIG. 2*b*) of an observer, is connected to an input of a low-pass filter 17. An output of the filter 17 is connected to an input of an adjustable signal delay device (T) 18, an output of which being connected to the remaining color signal input (R) of the matrix circuit 4. Thus, the transmitter 1' also incorporates a signal channel (13, 17, 18) for recording and processing the three-dimensional information component intended for the right eye RR. At the pick-up device 13, it is indicated that the information corresponding to the right eye RR is processed in the color television system as the red colour signal (RR→R).

The information items applied to the matrix-coding circuit (4, 5) shown in FIG. 2*a* are processed therein as color information and are applied as luminance and color difference information to the coding circuit 5, which, in accordance with the standard, produces the signal CVBS which now, however, does not contain color (C)-video (V) information but instead thereof the three-dimensional picture information which is designated by CVBS=3DBS. The signal CVBS=3DBS assembled in accordance with the PAL, NTSC or SECAM standard is transmitted to the receiver 2 of FIG. 2*b* via the transmission channel 6.

Figure 2B:
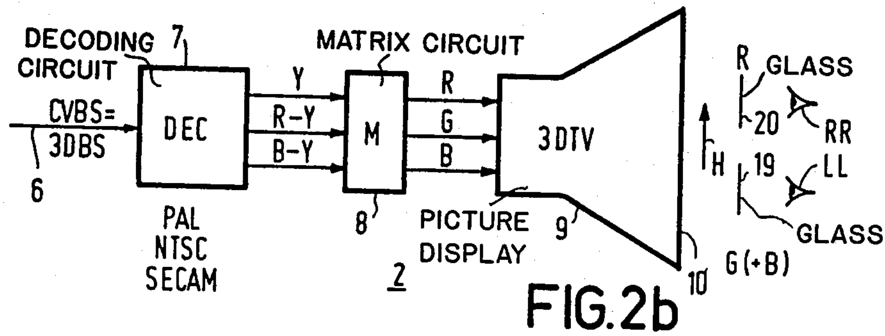
FIG. 2*b* shows a prior art color television receiver as shown in FIG. 1*b*, a three-dimensional picture being observable on a display screen of the receiver.

In FIG. 2*b*, the eyes LL and RR of an imaginary observer (LL, RR) are shown at the receiver 2. In front of the eyes LL and RR there are glasses 19 and 20 through which the screen 10 is observed. The glass 20 only transmits light of a red color (R), while the glass 19 only transmits light of a green color (G) or also light of a blue color (G+B). The screen 10 is observed through the spectacles (19, 20), the direction of line scan, i.e. the horizontal direction, being indicated by means of an arrow H, in which direction the eyes LL and RR are located. The three-dimensional information components for the two eyes RR and LL are present on the display screen 10 in two sub-pictures which are shifted with respect to each other in the direction of line scan H. The right eye RR observes the imaginary picture of the red color, via the glass 20, while the left eye LL observes the imaginary picture of the green or the green-bluish color which is shifted in the direction of line scan H via the glass 19.

The use of the low-pass filter 14 in the transmitter 1' is essential for the invention. The cut-off frequency, i.e. the highest frequency in the bandwidth of the filter 14 is, the PAL, NTSC or SECAM-standard being used, approximately equal to 750, 500 or 750 kHz, respectively. The bandwidth of the filter 14 is, in this situation, substantially equal to the bandwidth of the color difference signal channels in the decoding matrix circuit (7, 8) of the receiver 2. The frequency values mentioned in the foregoing are found in practice, but for the sake of completeness, it should be noted that the mutually different bandwidths of the color difference signal channels laid down in the relevant standard are greater in the standard matrix-coding circuit (4, 5) of the transmitter 1, so that transmitted higher frequency color difference information will in practice not be manifest on display.

The use of the low-pass filter 14 having a bandwidth which is not more than the bandwidth of the color difference signal channels in the decoding-matrix circuit (7, 8) prevents any disturbing crosstalk, from the information coming from the frequency-limited signal channel (12, 14, 15) to the information obtained from the signal channel (13, 17, 18), from occurring. So on display only the information intended for the left eye LL reaches that eye and there is no cross-talk to the right eye RR.

There is, however, high frequency cross-talk from the information obtained from the signal channel (13, 17, 18) to the information obtained from the signal channel (12, 14, 15). As a result thereof, part of the information intended for the right eye RR also reaches, on display, the left eye LL. This is not wholly impermissible in practice, but the picture quality can be improved by relatively amplifying before, display the information coming from the signal channel (12, 14, 15) with respect to the information coming from the (cross-talking) signal channel (13, 17, 18). To that end the signal processing circuit 15 is provided in the transmitter 1'.

From the relation $Y=0.30R+0.59G+0.11B$ in accordance with the standard and the couplings shown in the transmitter 1', it follows that the luminance signal produced in the matrix circuit 4 is equal to $Y=0.3\ RR+0.7\ LL$.

It can be seen that the information signal coming from the signal channel (12, 14, 15) has an amplitude which is a factor of 7/3 greater than that of the information signal coming from the signal channel (13, 17, 18). In order to obtain, on display equally amplitude information for the left eye LL and the right eye RR, the signal on the color signal inputs (G) and (B) of the matrix circuit 4 should be attenuated by a factor of 3/7 or approximately 7 dB. In FIG. 2*a* it is shown at the circuit 15 that this circuit produces an adjustable attenuation of 3 dB, so that the signal on the color signal inputs (G) and (B) of the matrix circuit 4 is relatively amplified with respect to the signal on the color signal input (R) of the circuit 4. This results in an improved picture quality.

In the low-pass filter 14 there may be a signal delay time which reduces the picture quality on display. The signal delay device 18, which has an adjustable signal delay time T to compensate for this delay, is provided.

In order to obtain a further reduced cross-talk resulting in an improvement in the picture quality, the low-pass filter 17 is provided in the transmitter 1'. At the low-pass filter 17, it is indicated that the cut-off frequency, i.e. the highest frequency in the filter bandwidth, the PAL, NTSC or SECAM-standard being used, is approximately equal to 3.7, 3.0 or 3.5 MHz, respectively. For the choice of this highest frequency value it holds that the sum of the highest frequencies in the bandwidths of the first and second low-pass filters 14 and 17 is less than or substantially equal to the frequency of the chrominance subcarrier given in the relevant standard. So it holds for the PAL-standard that the sum frequency of 4.45 MHz is approximately equal to the chrominance subcarrier frequency of approximately 4.43 MHz and for the NTSC-standard it holds that the sum frequency of 3.5 MHz is less than the chrominance subcarrier frequency of approximately 3.58 MHz. For the SECAM-standard which specifies two chrominance subcarriers of 4.250 and 4.406 MHz, the sum frequency of 4.250 MHz does not exceed the lowest carrier frequency.

The use of the low-pass filter 17 with its above-mentioned bandwidth results in high-frequency cross-talk from the luminance signal channel to the color difference signal channels being reduced on decoding, so that no disturbing cross-color occurs on display. This cross-color causes different impressions for the eyes RR and LL and this can be obviated by the use of the filter 17. When the pick-up device 13 is in the form of a black-white television camera capable of producing a video signal having a bandwidth up to only approximately 3 MHz the filter 17 is, of course, superfluous. When the filter 17 has a signal delay time shorter than that of the filter 14 with its lower bandwidth, the signal delay device 18 serves to compensate for the difference in delay times.

When the switch 16 in the transmitter 1' is closed, the glass 19 should transmit light of a green and a blue color (G and B). As in practice a glass only transmitting light of a green colour is cheaper to produce, the glass 19 may be such a glass. On display, then only the (green) component 0.59 LL of the three-dimensional information component coming from the signal channel (12, 14, 15) and having the value (0.59+011) LL is observed. In principle, opening of the switch 16 does not effect the display. However, it is preferable to apply a signal to the color signal input (B) of the matrix circuit 4 of the transmitter 1' as this input then becomes less sensitive to interference. Instead of connecting the signal channel (12, 14, 15) to two of the inputs of the matrix circuit 4 the signal channel (13, 17, 18) may have such a connection.

In practice it has been found that good picture quality on display results from connecting the signal channel (13, 17, 18) having the wide bandwidth to the color signal input (R) of the matrix-coding circuit (4, 5) and the signal channel (12, 14, 15) having the narrow bandwidth to the color signal input (G) or inputs (G and B). There is then no cross-talk in display from the three-dimensional stronger (0.59 or 0.7) information component having the narrow bandwidth to the weaker (0.3) information component having the wide bandwidth. There is high-frequency cross-talk in the other direction which, however, is acceptable owing to the fact that it has less effect on its own, stronger information.

What is claimed is:

1. A three-dimensional television system comprising a transmitter having a picture pick-up arrangement, a receiver incorporating a picture display device, and a signal transmission system arranged between the transmitter and the receiver, the picture pick-up arrangement comprising first and second picture pick-up devices for recording a scene from different positions, the picture display device having a color picture display screen for displaying in two different colors, information intended for a left and a right eye, respectively, of an observer, the items of information being contained in first and second subpictures, respectively, which are shifted in the direction of line scan, which, when the overall picture is observed with two eyes through spectacles having glasses of different colors, results in a three-dimensional picture, characterized in that said signal transmission system is suitable for signal transmission coded in accordance with the PAL, NTSC or SECAM-standards for which purpose the transmitter comprises a matrix-coding circuit and the receiver comprises a decoding-matrix circuit, both incorporating signal channels for processing color difference signals and a luminance signal, an output of the first picture pick-up device in the picture pick-up arrangement being coupled to at least one input of the matrix-coding circuit via a first low-pass filter, an output of the second picture pick-up device being coupled to at least one further input of the matrix-coding circuit, the first low-pass filter having a bandwidth which is not more than the bandwidth of the color difference signal channels in the decoding-matrix circuit of the receiver.

2. A system as claimed in claim 1, characterized in that in addition to said first low-pass filter, the transmitter comprises a second low-pass filter arranged between the output of the second picture pick-up device and said at least one further input of the matrix-coding circuit, the second low-pass filter having a wider bandwidth than the first low-pass filter, it holding that the sum of the cut-off frequencies of the first and second low-pass filters is less than or substantially equal to the frequency of the chrominance subcarrier specified in the respective standard.

3. A system as claimed in claim 1 or claim 2, characterized in that between the output of the second picture pick-up device and said at least one further input of the matrix-coding circuit, there is provided a signal delay device having a time delay which compensates for at least a portion of the signal time delay occurring in said low-pass filter which is coupled to the first picture pick-up device.

4. A system as claimed in claim 1 or claim 2, characterized in that between the output of the first picture pick-up device and the at least one input of the matrix-coding circuit coupled thereto, there is provided a signal processing circuit for obtaining, with respect to the signal occurring at the at least one further input of the matrix-coding circuit, a relative amplification of the signal at the first-mentioned, at least one input thereof.

5. A system as claimed in claim 1 or claim 2, characterized in that the output of the second picture pick-up device is coupled to a red color signal input of the matrix-coding circuit and the output of the first picture pick-up device is coupled to a green color signal input of the matrix-coding circuit and selectively to a blue color signal input of the matrix-coding circuit.

6. A system as claimed in claim 2, characterized in that when coding and decoding circuits in accordance with the PAL-standard are used, the cut-off frequencies of the first and the second low-pass filters, respectively, are approximately 750 kHz and 3.7 MHz, respectively.

7. A system as claimed in claim 2, characterized in that when coding and decoding circuits in accordance with the NTSC-standard are used, the cut-off frequencies of the first and the second low-pass filters, respectively, are approximately 500 kHz and 3 MHz, respectively.

8. A system as claimed in claim 2, characterized in that when coding and decoding circuits in accordance with the SECAM-standard are used, the cut-off frequencies of the first and the second low-pass filters, respectively, are approximately 750 kHz and 3.5 MHz, respectively.

* * * * *